March 26, 1929.                L. H. LARSEN                1,706,577
                    FRUIT CLEANING AND POLISHING MACHINE
                            Filed July 8, 1926
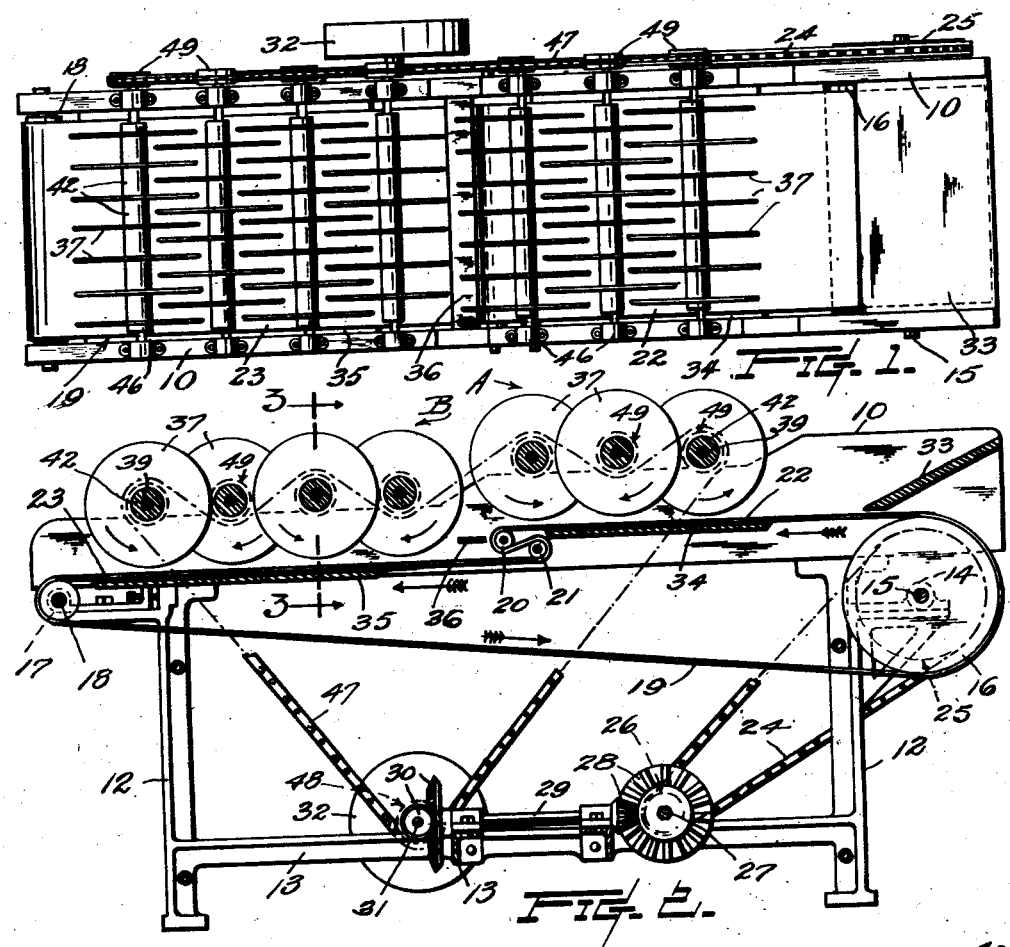
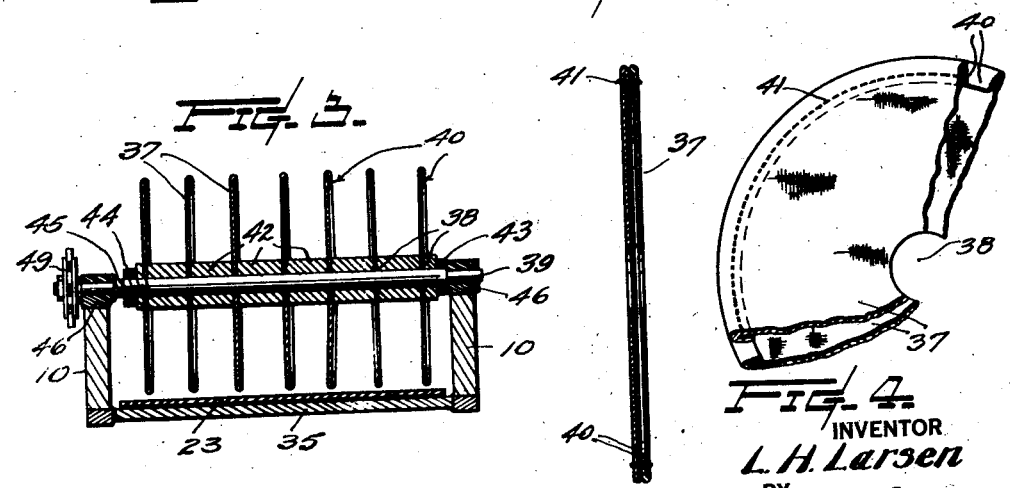
INVENTOR
L. H. Larsen
BY
ATTORNEY Patented Mar. 26, 1929.

1,706,577

UNITED STATES PATENT OFFICE.

LARS H. LARSEN, OF ZILLAH, WASHINGTON.

FRUIT CLEANING AND POLISHING MACHINE.

Application filed July 8, 1926. Serial No. 121,119.

This invention relates to machines employing wipers for cleaning and polishing fruit such, for examples, as apples and pears.

The object of my invention, generally stated, is the perfecting of a machine of this character to render the same more effective, expeditious and less liable of bruising the fruit than with other machines hitherto in use.

A more specific object is to provide a machine with cooperating feeding and wiping devices constructed and associated in a manner to effect the rotation of the fruit about axes perpendicular, or nearly so, to the plane of their travel upon the feed conveyor.

Another object is the provision of means which is rendered operable by the feed conveyor to effect the turning of the fruit about substantially horizontal axes for the purpose of inverting the fruit so that the entire surfaces thereof be presented to the wipers.

Another object is to arrange the wipers in such relation with each other and rotating them in a manner which tends to produce side to side movement of the same upon the conveyor.

Another object is the improvement of the wipers themselves.

More specific objects and advantages of the invention will appear in the following description.

The invention consists in the novel construction, adaptation and combination of parts hereinafter described and claimed.

In the accompanying drawing,—

Figure 1 is a plan view of a machine embodying the present invention; Fig. 2 is a longitudinal vertical section thereof, the driving mechanisms for the wiper system and feed devices being shown somewhat diagrammatically; and Fig. 3 is a transverse sectional view taken substantially in the plane of the line 3—3 of Fig. 2. Fig. 4 is a fragmentary side elevation of a modified form of wiper element, and Fig. 5 is a transverse section of a wiper such as illustrated in Fig. 4.

As shown in said drawing, the frame of the machine comprises two side walls 10 rigid with supporting members having leg and bar elements 12 and 13, respectively. Provided at one end of the frame are bearing boxes, as 14, for the shaft 15 of a pulley 16; and at its other end, is provided with bearing boxes, such as 17, for the shaft of a pulley 18. About these pulleys extend an endless belt 19 of flexible material, such for example as canvas, which belt is arranged longitudinal of the machine frame. As shown, the belt part extending between the upper portions of the pulleys 16 and 18 is directed and controlled by means of guide pulleys 20 and 21 to afford two leads 22 and 23 operating in the same direction in different planes.

The lead 22, at the receiving end of the machine, is positioned in a higher plane than that of the lead 23 at the delivery end of the machine. The feed belt is driven in the directions denoted by feathered arrows in Fig. 2, by means, preferably, of an endless chain 24 passing about a sprocket wheel 25 upon the pulley shaft 15 and a sprocket wheel, indicated by 26 in Fig. 2, provided upon a shaft 27. The shaft 27 is rotated through the medium of toothed gear wheels 28 from an intermediate shaft 29 which, in its turn, is rotated through the medium of toothed gear wheels 30 from a shaft 31 which is rotated as by means of a power driven belt (not shown) and the pulley 32 therefor which is mounted upon the shaft 31.

Above the feed belt at the head end of the machine is a fruit receiving hopper which is formed, preferably, in the machine itself by means of an inclined apron 33 located between the side walls 10.

34 and 35 represent bed plates rigid with the frame, said bed plates being located directly below the respective leads 22 and 23. Said bed plates are, moreover, positioned longitudinally of the machine so that the bed plate 34 will be in spaced apart relation from the delivery end of the hopper apron 33, and the other bed plate 35 in spaced apart relation from the guide pulley 20, substantially as shown in Fig. 2.

The bed plates function to firmly support portions of the respective leads; the portions of the leads which are unsupported by the bed plates—that is to say, the portions bridging the spaces not provided with bed plates—are yieldable to fruit falling upon said leads for the purpose of protecting the fruit from becoming bruised.

36 represents a bar extending transversely of the machine in proximity of the belt-guiding pulley 20 and is located intermediate the planes of the belt leads 22 and 23.

The machines' fruit cleaning and polishing devices, proper, comprise a plurality of disk shaped elements 37, hereinafter designated as wipers, which are formed of soft pliant material such, for instance, as canvas or felt. Each of these wipers is of an annular shape to afford a central hole 38 to receive an arbor, as 39 Fig. 3. A wiper disk may be made of one thickness of material, as in Fig. 3, which is cut to a circular shape and has its peripheral edge folded as at 40 inwardly and secured as by sewing the turned over edge to the main portion of the disk.

In Figs. 4 and 5, is illustrated a wiper composed of two disks, the complementary disks are arranged to have their turned over edges opposed to each other; the complementary disks being coupled by sewing as indicated by 41 in Figs. 4 and 5.

Pluralities of wipers are mounted in spaced apart relation between separating sleeves 42 upon arbors 39. Such an assembly of wipers and sleeves being secured between a collar 43 rigid with the arbor and a nut 44 engaging a screw threaded portion 45 of the arbor.

The arbors equipped with wipers, as above described, are journaled in bearing boxes 46 formed or provided upon the frame wall members 10. The elevations of said arbors are desirably such that the wipers will be in proximity of the respective leads. As shown in Figs. 1 and 2, the arbor and wiper assemblies are arranged in side by side relation to provide a battery of wipers indicated by A, for the upper lead 22 of the feed belt, and a second battery of wipers, indicated by B, for the lower lead 23. The wipers pertaining to each of the arbors of both batteries are arranged in vertical planes intermediate the planes of the wipers of the next adjacent arbors, as will be understood from an inspection of Fig. 1.

The alternating arbors are driven in opposite rotary directions as by means of an endless chain 47 driven from a sprocket wheel 48 on the shaft 31, said chain engaging sprocket wheels 49 of the wiper arbors as indicated by broken lines in Fig. 2.

In operation, fruit—as apples, for instance—is deposited upon the hopper apron 33 whence the apples descend by gravitation upon the feed belt lead 22 and are frictionally carried by the later at a relatively low speed of travel among the battery A of wipers to have the upper portions, more particularly, cleaned and polished thereby. The wipers which are rotated at a relatively high speed and turning in opposite directions, as indicated by arrow heads in Fig. 2, act upon the apples, as the latter are frictionally carried by the feed belt, to rotate them about substantially vertical axes, first in one rotary direction, then in the other, and so on.

Such spinning, so to speak, causes the apple surfaces to be brought into most advantageous positions to be affected by the wipers which is promoted by sidewise movements of the apples due to the spinning of the same upon the traveling belt. Sidewise movements are also produced by centrifugal force tending to maintain each of the disk shaped wipers in a vertical plane so that the apples are pushed to one side or the other, unless the apples engage the wipers medially of their planes, whereupon the wipers yield to permit the passage of the apples. Apples reaching the end of the first lead 22 are tumbled over upon the landing bar 36 from which they are, in turn, tumbled over upon the receiving end of the lead 23, and in being thus transferred, the apples are deposited upon the lead 23 in upside down positions with respect to their positions upon the lead 22.

The movement of the apples from the landing bar usually is produced by their momentum, which, if insufficient is supplemented by the apples lodging on the landing bar being pushed therefrom by apples which follow from the lead 22. The first set of wipers of the B battery also facilitate the turning movements of the apples tumbling from the landing bar.

The action of the wipers associated with the lead 23 is similar to those performed by the wipers associated with the other lead 22. The apples discharged from the battery B wipers are delivered in a cleaned and polished condition by means of the belt conveyor of the machine upon a table, conveyor or other receiving means (not shown) ready for wrapping and packing.

The circular or disk shapes of the wipers are of considerable importance inasmuch as they constitute wipers instead of beaters, providing webs which under the action of centrifugal force tend to maintain the respective webs in vertical planes.

The doubled-over edges of the wiper webs prevent their becoming frayed, as frayed edges are found to collect thereon solid substances which is objectionable when operating upon thin skinned and tender varieties of fruit which are easily bruised or otherwise injured. The provision of the base plates 34 and 35 serve to retain the belt leads beneath the respective batteries of wipers in positions most suitable to operate upon the fruit. The fruit is, however, led upon the portions of the belt leads which are supported by the base plates from portions of the leads which are not thus supported, such unsupported portions of the leads functioning as cushions upon which the fruit may be deposited without danger of becoming bruised.

The construction and operation of the above described embodiment of the invention will, it is believed, be understood from the foregoing description.

I do not wish to be understood, however, as confining myself specifically to the aforedescribed structure except as limited by the scope of the appended claims.

What I claim, is,—

1. In a machine of the character described, the combination with the machine frame provided with bed plates disposed at different elevations, a battery of wiping devices located above each of said bed plates, an endless feed-belt passing above said bed plates, guide rollers for directing the fruit carrying portion of the belt into leads arranged to pass over the respective bed plates in close proximity to the upper surfaces thereof, and means to drive said feed belt and the wiping devices.

2. In mechanism as defined in claim 1, wherein a landing bar is provided in proximity of the delivery end of the upper lead and at an elevation intermediate the planes of both of the leads.

3. In a machine of the character described, a plurality of transversely arranged arbors, wiping devices mounted thereon in spaced apart relations, means to drive the arbors to effect the rotation of the successive ones and the associated wiping devices in opposite rotary directions, an endless feed belt formed of a flexible material having a fruit carrying lead passing below said wiping devices, means to drive said feed belt, and a bed plate rigid with the machine frame and serving to support said lead to pass as a plane smooth surface beneath the wiping devices.

Signed at Zillah, Washington, this 29th day of May, 1926.

LARS H. LARSEN.